Figure 1:
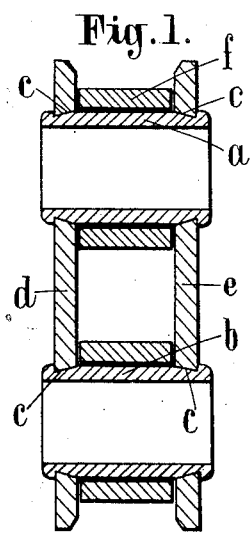

Sept. 17, 1929.  C. G. RENOLD ET AL  1,728,445

SPROCKET CHAIN

Filed Jan. 25, 1927

INVENTOR
Charles G. Renold
and Alfred Renshaw
BY
Hill & Jennings
ATTORNEYS

Patented Sept. 17, 1929

1,728,445

UNITED STATES PATENT OFFICE

CHARLES GARONNE RENOLD AND ALFRED RENSHAW, OF MANCHESTER, ENGLAND

SPROCKET CHAIN

Application filed January 25, 1927, Serial No. 163,347, and in Great Britain February 23, 1926.

The present invention relates to sprocket chains and although it has reference more particularly to driving chains such as are employed in the power transmission systems of motor bicycles and motor cars, it has more general application, in fact it may be applied to, any form of chain passing over or driven by sprocket wheels such as chains used in conveyors, elevators and so forth.

The invention is particularly concerned with methods of retaining the side plates of sprocket chain links in position and is primarily applicable to maintaining the side plates of the so-called inner combinations of sprocket chains in position on the ends of their hollow bushes. The invention, however, is applicable generally, that is to say, it is also applicable to maintaining in position the side plates of the outer links whether these are connected together by hollow studs or by the more usual solid rivets. Furthermore the invention may be applied to sprocket chains wherein rollers are mounted upon the hollow bushes as well as to chains in which such hollow rollers are not employed.

According to the present invention studs or hollow bushes are employed which have an external diameter slightly greater than the bore of the holes in the side plates of the links. The side plates are forced on to the ends of the bushes or studs, compressing these ends which then recover elastically and expand so as to form, practically speaking, small heads outside the link plates positively holding the link plates in position.

Although the invention includes the use of such hollow studs or bushes which have plain outer surfaces, it is much preferred to form the studs or bushes with annular grooves near the ends and to employ side plates with holes such that they make a force fit over the ends of the studs or bushes and are forced over the ends so that when the side plates or studs or bushes or both recover elastically, the side plates of the links have been forced into such grooves. The diameter of the hole in the side plate is such relatively to the size of the stud or hollow bush that there is a force fit between the side plate and the bush after the plate has taken up its position in the groove approximately equal to that which is usually allowed between the hole in the side plate and the outer surface of an ordinary parallel cylindrical bush. It is for this reason that in forcing the plate over the end of the bush the latter has to yield to a small extent to allow the plate to pass over it and the bush has to become resiliently restored to its original size when the plate reaches the groove. In the case of a bush or rivet which will not yield, the same result may be produced, of course, due to the elastic stretching of the side plate in its parts around the bush or rivet. It is found that if a side plate so forced into a groove in accordance with the present invention is again forced off from the bush that usually a thin ring of metal is retained in the groove, being sheared from the part of the side plate around the periphery of the punched hole. Thus the small head formed between the groove and the end of the bush or stud positively holds the link plate in position so that the strength of the joint formed according to the present invention does not depend merely upon frictional engagement but upon the resistance to shearing stresses of the metal of the plate around the central punched hole.

When holes in the side plates are punched they are slightly smaller in diameter on the side of the plate at which the punch enters than on the side of the plate in contact with the die during the punching operation because of the clearance which it is necessary to allow for the punch within the die, that is to say, the punched holes are approximately of a slightly conical form, being sharper at the small end than at the large end. When using such punched plates in accordance with the present invention, it is found preferable to present the plates with the larger end of the hole towards the bush. Advantage can be taken of the conical formation of the hole to afford an additional lock or security of the side plate in the groove. This may be effected by making the groove also conical with its part of smaller diameter towards the end of the bush. Then when the plate is sprung in position the sharp face of the plate engages with a face of the groove which is sharper than the other face and the result of this sharp edge of the plate catching against the sharp edge of the groove is to offer greater resistance to any sideways thrust tending to separate the plate and the bush.

In order that the invention may be clearly understood and readily carried into effect, some constructions for the inner combinations of sprocket chains will be described more fully with reference to the accompanying drawing, wherein:—

Figure 3:
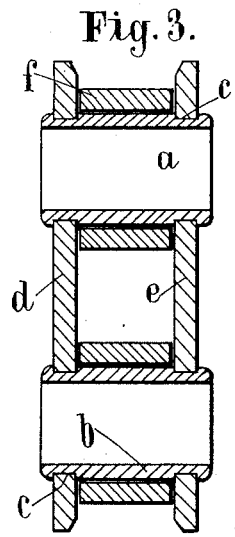
Figure 2:
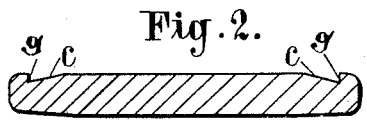
Figure 4:
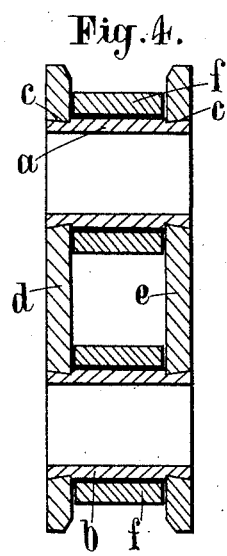
Figure 5:
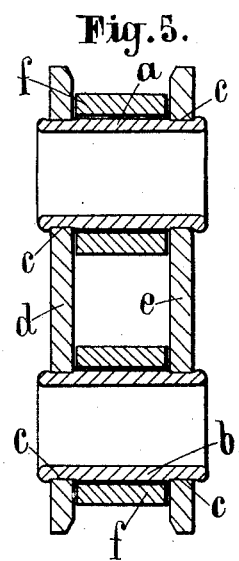

Figure 1 is a central section through such inner combination showing the preferred construction, Figure 2 is a cross section of the rolled strip from which the bushes illustrated in Figure 1 are coiled, Figures 3, 4 and 5 are views similar to Figure 1 of somewhat modified forms of construction.

Referring first of all to Figures 1 and 2, the two bushes $a$, $b$ holding together the inner combination of a driving chain link as shown have each a pair of grooves $c$ and, as seen in Figure 1, there is one groove close to each end of each of the bushes $a$, $b$. In these figures and in all the other figures of the drawings, the depth of the grooves has been intentionally exaggerated in order to show clearly the actual shapes of the grooves. For example, in the case of a motor cycle chain, the depth of the groove, that is the height of the vertical face $g$ of the groove as seen in Figure 2 only amounts from 0.0015 to 0.002 of an inch. It is preferred that the grooves shall be not quite at the ends but that the bushes shall be allowed to project slightly beyond the outer face of the side plates $d$ or $e$. The amount of this projection may be very small, for example in the case of an ordinary motor cycle chain it may be two or three-hundredths of an inch or even less, and clearly this can be allowed without having to modify seriously the overall dimensions of the chain. The heads formed by these small projecting portions are seen in Figure 1 at both ends of the bushes $a$ and $b$.

In the preferred construction shown in Figures 1 and 2, the grooves $c$ increase in depth towards the end of the bush, forming a conical surface on the latter which is of smaller diameter near the ends of the bush so that, as seen particularly in Figure 2, the grooves have practically a vertical face $g$ near the ends of the bush $a$ or $b$, then a gradually inclined conical surface ending at its inner end practically on the surface of the bush. Each of the side plates $d$, $e$ is punched with two holes in the proper position. As already explained, due to the fact that the punch used in perforating the side plates has to have clearance in the hollow die, the holes are normally formed slightly tapered, being of rather less bore on the side at which the punch enters than at the side at which the plates rest on the die. Each side plate $d$ or $e$ is presented to the bushes $a$ and $b$ in such a way that the larger end of the hole faces the end of the bush, and subsequently after forcing on the side plate and allowing the bush to recover elastically, the smaller end of the hole in the plate, that is to say the end with the sharper edge, engages with and abuts against the vertical face $g$ of the groove. The improved construction can be particularly conveniently employed when the bushes $a$ and $b$ are coiled from a continuous strip instead of being turned solid. Figure 2 illustrates a cross section of a suitable strip to an enlarged scale. It is rolled in a continuous length with the grooves $c$ already formed. This length is cut up into sections of the necessary length and these are coiled into bushes. It can be seen that such a form of bush is particularly suitable to allow of the necessary elastic yielding and recovery as the side plates $d$, $e$ are forced into position.

In Figure 3 a somewhat modified form of construction is illustrated, but as the same reference letters have been used as in Figures 1 and 2, there is no need to describe the construction in detail. It may be pointed out, however, that the grooves $c$ in each of the bushes are here cylindrical and consequently the holes in the side plates $d$ and $e$ may be parallel. In this case the bush $a$ or $b$ yields, as already described, when forcing the side plates $d$ and $e$ on to the bushes and the latter are then restored so that the plates $d$ and $e$ make a force fit against the cylindrical bottom surface of the grooves.

In yet another form, as illustrated in Figure 4, the bushes are arranged so that there are no projecting ends beyond the outer surface of the side plates $d$ and $e$. The grooves $c$ are again illustrated as tapering, leaving a conical surface at each end of the bush, but they are inclined in the opposite direction to that shown in Figure 1, that is to say, the grooves have their greatest depth away from the ends of the bush but actually terminate at the surface of the bush at the extreme end of the latter. In this case, of course, the side plates $d$ and $e$ are presented in the opposite direction, viz, with their sides at which the holes have the smaller diameter pushed first on to the bushes. The joints made according to this method do not hold as well as those described above, but it does, of course, avoid any amount of projection which may, in some cases, upset, although slightly it is true, the design of a chain.

Finally in the construction illustrated in Figure 5, we have an example of bushes with plain surfaces, that is to say, without annular grooves, and it can be seen that the outer surfaces of the bushes *a* and *b* shown in Figure 5 are, at any rate before forcing on the side plates, strictly cylindrical. Here again the external diameter of the bushes *a* and *b* is slightly greater than the bore of the holes in the side plates *d* and *e*. The latter are forced on to the ends of the bushes *a* and *b* compressing these ends and, as shown are pressed on sufficiently far to allow the extreme ends to recover elastically and to expand, forming small heads outside the link plates. Here again, of course, the deformation of the bushes *a* and *b* is shown exaggerated in the drawing. In this form of construction there is nothing positively to limit the amount of inward movement of the link plates over the bushes. If desired, however, the bushes may be formed with small shoulders to limit the inward travel of the link plates.

In chains made according to the present invention, the hollow bushes used and also the studs used, if they are hollow, may be made from solid metal, for example, by turning or pressing, but as already indicated, they may be made conveniently by coiling strips of metal as illustrated in Figure 2. Furthermore, as already mentioned, they are slightly greater in external diameter than the bore of the holes in the side plates so that their natural elasticity allows the ends of the bushes or studs to open out again after passing through the holes in the side plates *d*, *e*. Except in the construction illustrated in Figure 4, it is preferred to allow the bushes to project beyond the side plates of the links by two or three-hundredths of an inch. It is found by means of careful tests that the novel chains, when the cylindrical bushes project beyond the outer surfaces of the side plates of the links, will stand considerably more pressure than chains hitherto in general use in which the cylindrical bushes do not project beyond the face of the links. Also the improved chains show better wearing qualities in use than chains with riveted bushes. This may be due to the fact that riveting tends to destroy the natural hard surface of the bush or stud. Moreover chains in which the bushes of the inner combinations extend beyond the outer faces of the side plates are calculated to exhibit less friction on the inner face of the side plates of the outer links because the bushes securing the inner link plates together, owing to their projecting ends, serve to space the inner surfaces of the outer link plates slightly apart from the outer surfaces of the inner link plates, and the outer link plates are consequently only in contact with the end surfaces of the said bushes. This spacing also facilitates cooling, which is an important matter, particularly when the chains are run at very high speeds as is the case, for example, in motor cycle racing.

However, the novel method of fixing bushes and rivets or hollow studs into the link plates is not limited, as already mentioned, to motor cycle or like driving chains. It may be applied to all sizes of roller chains or chains in which hollow studs replace the bearing surfaces of the rollers. In all the forms illustrated the bushes *a*, *b* are shown to form a bearing for rollers *f*, but clearly the construction does not prevent the surfaces of the bushes *a* and *b* from playing the same part as the bearing surfaces of these rollers. The invention may also be employed for securing into the side plates the short or half length bushes which are necessary in carrying out the invention set forth in British patent application No. 3,257, A. D. 1926.

Having thus described our invention, what we claim as new and desire to secure by Letters Patent is:—

1. An inner combination for a sprocket chain comprising a stud and perforated side plates forced on to the ends of said stud, the bore of the holes in said side plates being slightly smaller than the external diameter of said stud such that after elastic recovery of the parts adjacent the joints, the material of the stud at its extreme ends positively retains said side plates.

2. An inner combination for a sprocket chain comprising a pair of studs and a pair of perforated side plates forced on to the ends of said studs, each of the holes in said plates having a bore slightly less than the external diameter of said studs such that after elastic recovery of the parts adjacent to the joints the material at the extreme ends of said studs positively retains the side plates.

3. An inner combination for a sprocket chain comprising a pair of studs, a pair of perforated side plates forced on to the ends of said studs, each of the holes in said plates having a bore slightly less than the external diameter of said studs such that after elastic recovery of the parts adjacent to the joints the material at the extreme ends of said studs positively retains the side plates, and a pair of rollers, each surrounding one of said studs.

4. An inner combination for a sprocket chain comprising a pair of studs, each formed with an annular groove near each of its ends, and a pair of side plates perforated with holes to make a force fit over the end of said studs and forced into position so as to be retained in said grooves.

5. An inner combination for a sprocket chain comprising a pair of hollow studs and each formed with an annular groove near each of its ends, and a pair of side plates perforated with holes to make a force fit over the end of said studs and forced into position so as to be retained in said grooves.

6. An inner combination for a sprocket chain comprising a pair of hollow studs coiled from strip material and each formed with an annular groove near each of its ends, and a pair of side plates perforated with holes to make a force fit over the end of said studs and forced into position so as to be retained in said grooves.

7. An inner combination for a sprocket chain comprising a pair of studs, each formed with an annular groove near to each of its ends, each of said grooves increasing in depth towards the respective end of said studs and a pair of side plates each punched with a pair of tapered holes of such bore that when the side plates are forced on to the bushes the side plates are retained in the grooves due to elastic recovery of the parts adjacent the joints.

8. An inner combination for a sprocket chain comprising a pair of hollow studs, each formed with an annular groove near to each of its ends, each of said grooves increasing in depth towards the respective end of said studs so as to provide positive retaining shoulders and a pair of side plates each punched with a pair of tapered holes of such bore that when the side plates are forced on to the bushes the side plates are retained in the grooves due to elastic recovery of the parts adjacent the joints.

9. A sprocket chain comprising a plurality of links, each of said links consisting in combination of a pair of hollow bushes, a pair of inner side plates, each perforated with two holes and forced on to said hollow bushes, the bore of said holes being such that the material of said bushes at their extreme ends positively retains said side plates after elastic recovery of the parts adjacent the joints, a stud passing through one of said bushes and a pair of outer side plates secured on opposite ends of said stud.

10. A sprocket chain consisting of a plurality of links, each consisting in combination of a pair of hollow bushes, each formed with an annular groove near to each of its ends, a pair of inner side plates forced on to said bushes and retained in said annular grooves due to elastic recovery of the parts adjacent the joints, a stud passing through one of said bushes, and a pair of outer link plates secured on opposite ends of said stud.

In witness whereof we hereunto subscribe our names this 11th day of January, 1927.

CHARLES GARONNE RENOLD.
ALFRED RENSHAW.